(12) United States Patent
Jarnik

(10) Patent No.: US 11,748,483 B2
(45) Date of Patent: Sep. 5, 2023

(54) EFFICIENT FIRMWARE UPDATES

(71) Applicant: GIESECKE+DEVRIENT MOBILE SECURITY GMBH, Munich (DE)

(72) Inventor: Claus Jarnik, Windach (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 17/251,888

(22) PCT Filed: Jun. 25, 2019

(86) PCT No.: PCT/EP2019/000197
§ 371 (c)(1),
(2) Date: Dec. 14, 2020

(87) PCT Pub. No.: WO2020/001809
PCT Pub. Date: Jan. 2, 2020

(65) Prior Publication Data
US 2021/0124828 A1    Apr. 29, 2021

(30) Foreign Application Priority Data
Jun. 27, 2018   (DE) .................... 102018005091.3

(51) Int. Cl.
*G06F 9/44* (2018.01)
*G06F 21/57* (2013.01)
(Continued)

(52) U.S. Cl.
CPC ............ *G06F 21/572* (2013.01); *G06F 8/654* (2018.02); *G06F 21/54* (2013.01)

(58) Field of Classification Search
CPC ...................................................... G06F 21/572
(Continued)

(56) References Cited

U.S. PATENT DOCUMENTS

| 7,219,343 | B2 * | 5/2007 | Almeida | ................... | G06F 8/65 |
| | | | | | 709/215 |
| 8,893,110 | B2 * | 11/2014 | Kapadekar | .............. | H04L 41/00 |
| | | | | | 717/171 |

(Continued)

FOREIGN PATENT DOCUMENTS

| DE | 102016201361 A1 * | 8/2016 | ......... H04L 63/0853 |
| DE | 102016201361 A1 | 8/2016 | |

(Continued)

OTHER PUBLICATIONS

International Search Report and Written Opinion from PCT Application No. PCT/EP2019/000197, dated Nov. 6, 2019.

*Primary Examiner* — Evral E Bodden
(74) *Attorney, Agent, or Firm* — WORKMAN NYDEGGER

(57) ABSTRACT

The present invention is directed to a method for efficiently distributing embedded control commands to one or several security elements, in particular so-called embedded universal integrated circuit cards, of mobile end devices. The invention allows several updates to be combined in a simple manner to form a so-called bundle, so that an update server does not have to issue and distribute any special updates. The present invention is also directed to a correspondingly adapted update arrangement and to a computer program product with control commands that implement the method and/or operate the update arrangement.

13 Claims, 3 Drawing Sheets

(51) Int. Cl.
    *G06F 8/654*     (2018.01)
    *G06F 21/54*     (2013.01)

(58) Field of Classification Search
    USPC .......................................................... 717/168
    See application file for complete search history.

(56) References Cited

U.S. PATENT DOCUMENTS

| | | | |
|---|---|---|---|
| 9,213,537 B2* | 12/2015 | Bandakka | G06F 11/1448 |
| 9,524,158 B2 | 12/2016 | Li et al. | |
| 9,877,210 B1* | 1/2018 | Hildner | H04W 12/02 |
| 10,064,055 B2* | 8/2018 | Raleigh | H04L 63/0876 |
| 11,374,772 B1* | 6/2022 | Gulati | H04L 9/3268 |
| 2014/0173579 A1 | 6/2014 | McDonald et al. | |
| 2014/0189610 A1* | 7/2014 | Jones | G06F 3/0235 |
| | | | 715/863 |
| 2016/0246585 A1 | 8/2016 | Li et al. | |
| 2016/0316372 A1 | 10/2016 | Daksiewicz et al. | |
| 2017/0171742 A1 | 6/2017 | Yang | |
| 2017/0220404 A1* | 8/2017 | Polar Seminario | G06F 11/0736 |
| 2018/0357429 A1* | 12/2018 | Barzik | G06F 21/604 |

FOREIGN PATENT DOCUMENTS

| | | |
|---|---|---|
| WO | 2016041534 A1 | 3/2016 |
| WO | 2018021897 A1 | 2/2018 |

\* cited by examiner

EFFICIENT FIRMWARE UPDATES

BACKGROUND

The present invention is directed to a method for efficiently distributing embedded control commands to one or several security elements, in particular so-called embedded universal integrated circuit cards, of mobile end devices. The invention allows several updates to be combined into a so-called bundle in a simple manner, so that an update server does not have to issue and distribute any special updates. The present invention is further directed to a correspondingly adapted update arrangement and to a computer program product with control commands which implement the method and/or operate the update arrangement.

US 2017 0171742 A1 shows a method for file system management, in particular on a so-called embedded universal integrated circuit card.

WO 2018/021897 A1 shows an electronic device having an eUICC on which several profiles are installed.

WO 2016/041534 A2 shows selecting a so-called subscriber profile in the context of an embedded universal integrated circuit card.

US 2016 0316372 A1 shows installing several profiles on a security element.

According to the state of the art, so-called SIM cards are known, which are either permanently integrated into a mobile end device or can also be plugged in exchangeably. Exchangeable SIM cards are also referred to as Universal Integrated Circuit Card UICC, wherein end devices constructed in one piece with an embedded SIM card, i.e. an embedded Universal Integrated Circuit Card eUICC, are used in more and more application scenarios. One of these application scenarios is the so-called Internet of Things, in which everyday objects are equipped with a data interface. Such end devices require an operating system or firmware, which must also be updated correspondingly.

eUICCs can receive generic firmware update (FWU) packets with several firmware update images (FWUI) in one packet and independently extract and import the necessary parts from them.

The state of the art for eUICCs capable of firmware updates shows exemplary configurations (which are loaded onto eUICCs):
1. Base platform
2. Base platform+feature A
3. Base platform+feature B
4. Base platform+feature A and feature B For all INIs/configurations present in the field, separate firmware update packets must be created and distributed corresponding to the eUICC configurations. This means that for the four configurations listed above, four different, separate packets would have to be created. These update packets must match the individual firmware versions.

A typical FWU bundle transfer: Update Server—eUICC, according to the state of the art, proceeds as follows:
  The FWU bundle is transferred as a complete packet from an FW update server to a handset/device.
  The handset/device stores the complete FWU bundle in a suitable memory until the update has been carried out successfully.
  The handset/device transparently divides the complete packet into smaller blocks that are suitable for the eUICC and sends these over a suitable interface, for example a contactless interface, to the eUICC.
  eUICC collects and/or processes the individual data packets.

The update servers must distribute the individual packets to the correct eUICC in each case and know the exact, current firmware version. Each packet must be precisely adjusted to the firmware version and present features on the eUICC.

The known methods are very complex, since an update server has to know the individual end devices including their operating system version. For this purpose, individual update files must be issued and these must be distributed over a network. This results in a considerable computational effort, since the individual security elements can differ with reference to their construction type, the operating system and the installed version.

SUMMARY

It is therefore an object of the present invention to propose an improved method for distributing firmware and/or embedded control commands, which allows that a smaller technical effort is involved in updating such end devices. It is also an object of the present invention to propose a correspondingly adapted update arrangement and a computer program product with control commands which implement the proposed method and/or operate the update arrangement.

Accordingly, a method is proposed for efficiently distributing embedded control commands to a security element of a mobile end device, having a data-technical transmission of a combined data packet, having several updates for the security element and configuration information from a server to the mobile end device, reading out the transmitted configuration information by the security element of the mobile end device and selecting an update in dependence on the configuration information read out and an actual configuration of the security element and executing the selected update by the security element to adjust present control commands of the security element.

The person skilled in the art recognizes here that the method steps can be carried out iteratively and/or can have substeps. For example, the data-technical transmission can also be effected in such a manner that the combined data packet is split up and transmitted in individual packets over the network. The configuration information can also be read out iteratively in such a manner that partial information items are read out and processed. The update can also be executed in several substeps or, for example, be interrupted.

The proposed method is particularly efficient because the update server does not have to create an extra update version for every version and platform of a mobile end device and/or its security element. Rather, according to the invention, several update versions can be packed into a combined data packet and, according to the invention, it is then possible for the security element to select and install the corresponding update from this. The embedded control commands in their entirety form firmware or form a version of firmware. A version of firmware is an update that is integrated in the combined data packet.

The combined data packet contains, in a non-exhaustive list, the different updates which can be provided for different operating systems, versions and/or hardware platforms. Generic combined data packets are thus sent out, from which each security element selects the suitable update. Consequently, it is possible that the combined data packet is supplied to a multiplicity of different security elements or mobile end devices without these data packets having to be individualized beforehand.

The compilation of these combined data packets is effected by a server that combines several update versions. Configuration information is integrated in the combined data packet so that these update packets or the combined data packet can be interpreted and processed on the receiver side, namely by the mobile end device or the security element. This is meta information that describes which configuration options are possible based on the updates. This meta information can thus describe that a first update is suitable for a first operating system and a second update is suitable for a second operating system. Based on this meta information, namely the configuration information, it is possible for the security element to determine whether a suitable version of updates is present. For this purpose, the security element or the mobile end device can automatically read out which version of control commands is currently installed. From these several updates, based on the configuration information a selection is then made of which specific update is to be installed in the present case. This is typically an update with the same operating system, but which is present in a newer version.

In order to make the combined data packet available to the mobile end device or ultimately to the security element, said packet is transmitted in terms of data technology, which involves that the data packet is transferred via a communication connection. This communication connection can have an air interface and can in addition be wired. Typically, a mobile communication network is employed which has wire-based transfer paths and then ultimately transmits the data packets to the mobile end device by means of an air interface. For this purpose it can be advantageous to employ the data memory of the mobile end device, since security elements typically only supply small memory resources. The entire data packet can then be saved in the mobile end device, and only the selected updates can be loaded into the memory of the security element. In this manner, it is prevented that the memory of the security element overflows, since it typically cannot store several updates.

The mobile end device is communicatively coupled to the security element in such a manner that the security element is either interchangeably integrated into the mobile end device or else that the security element is embedded in the mobile end device. Consequently, the security element is either a universal integrated circuit card or else an embedded universal integrated circuit card. An embedded SIM card is preferred here.

In a subsequent method step, the transmitted configuration information is read out by the security element of the mobile end device and an update is selected in dependence on the configuration information read out and an actual configuration of the security element. Since the configuration information describes the individual updates, it is possible for the mobile end device or also, preferably, the security element to interpret this meta information and then to recognize which update is suitable. The latest version of the updates, which is compatible with the prevailing operating system and hardware platform, is typically employed for this purpose. The security element can read out this information itself, since it is the actual configuration of the security element. Another word for an actual configuration is the current configuration of the security element. For this purpose, interfaces are provided that allow the security element which platform it is employing and/or which operating system is in which version. As a result, the actual configuration and the configuration information are verified, and the security element selects the update which is suitable in the present case.

When the selected update is executed, the update is installed which has been selected from the combined data packet based on the update information or configuration information. In order to execute the update, it is necessary to overwrite, modify and/or supplement control commands which are already installed in the security element. Further method steps may be necessary here, such as restarting the mobile end device so that the updates can be used. After the selected update has been executed, the control commands, i.e. the embedded control commands, are updated as firmware and, if necessary, security gaps have been closed and/or the functionality expanded.

The present invention is not only directed to the update per se, which relates to the firmware, but rather further characteristics, so-called features, can also be installed. As a result, the update can also be referred to as the base platform and further features, for example Feature A and Feature B, can be installed in addition. Such characteristics or features are described by the configuration information as well. In an analogous method, these features are selected and the features described in the configuration information are compared with the actually present features. An installation of these features is effected then within the scope of executing the selected update.

According to one aspect of the present invention, the security element is supplied as a universal integrated circuit card UICC or an embedded universal integrated circuit card eUICC. This has the advantage that present interfaces can be reemployed and, in particular, that mobile end devices from the application scenario of the Internet of Things can be employed. Such devices of the Internet of Things typically have corresponding security elements, so that no further data memories or processors are necessary. A further possible mobile end device is a smart phone, wherein the present invention is preferably not implemented as a smart phone. According to the invention, it is particularly advantageous that end device devices from the Internet of Things application scenario are present in large numbers and that there are, in particular, different hardware platforms and software platforms. As a result, the technical contribution is particularly advantageous in this area of application, since embedded control commands are distributed efficiently and the efficiency becomes noticeable with a multiplicity of mobile end devices in particular.

According to a further aspect of the present invention, the embedded control commands are supplied as firmware. This has the advantage that software that is embedded in the electronic device can be updated. So-called flash memories or read-only memories can be employed for this. Firmware is always functionally permanently connected to the hardware, which is why a technical contribution is made even if a computer-implemented invention is proposed. The proposed method can for example be implemented at least partially as a network protocol.

According to a further aspect of the present invention, each update supplies an independent adjustment of a base platform of the security element. This has the advantage that complete versions are supplied and not individual control commands, so that the update process can be carried out with a single update. Optionally, so-called features can be installed, but these do not prevent the update from supplying a complete version of an update.

According to a further aspect of the present invention, each update has at least one optional feature of an adjustment. This has the advantage that an update can be supplied for a base platform and further features, for example Feature A and Feature B, can be supplied. Thus, the functionality of the security element and/or the mobile end device can be expanded. As a result, not only firmware is supplied, but additional functionality can also be installed. The functionality of the security element can also be reduced, i.e. functionality that is no longer required can be removed again.

According to a further aspect of the present invention, the configuration information provides an indication of a compatible hardware platform and/or a compatible operating system. This has the advantage that based on this meta information it can be decided which update or which features are selected. It is always noted on a mobile end device or on a security element which hardware platform is used at the basis and/or which operating system is applied. An update can therefore always be selected from the plurality of updates for the suitable manufacturer of the hardware and/or the operating system.

According to a further aspect of the present invention, the configuration information describes the updates with reference to present updates, version, compatibility, availability and/or memory space requirements. This has the advantage that further meta information is supplied which allows the security element to select the suitable, i.e. compatible and newer version of the update. Typically, the latest version is always selected and the same hardware platform and software platform are reemployed. It can also be checked whether the memory space requirement of the update to be newly installed exceeds the memory space of the security element. If the present memory space is not sufficient, a smaller, i.e. less extensive, update can be selected correspondingly.

According to a further aspect of the present invention, the selection of the update comprises a comparison of the transmitted configuration information with currently created configuration information of the security element. This has the advantage that the security element can read out the underlying hardware and can ascertain in addition which software platform, i.e. which operating system, is installed. The security element can then select a compatible newer version of the control commands and install the suitable update.

According to a further aspect of the present invention, non-selected updates are discarded. This has the advantage that exactly one update is selected from the plurality of updates and the further updates are not employed for storing on the security element. There is therefore no problem with reference to the memory space either, since the combined data packet can be stored on the mobile end device and then only the relevant updates are uploaded to the security element. Non-selected updates are then simply discarded; i.e. deleted.

According to a further aspect of the present invention, adjusting present control commands includes describing, supplementing, changing and/or expanding control commands. This has the advantage that the present firmware can be updated in every respect, i.e. also that entire parts of the present update are deactivated, overwritten and then restarted.

According to a further aspect of the present invention, the configuration information is stored at the beginning of the combined data packet. This has the advantage that the security element can read out the configuration information in any case, even if further updates have not yet been transmitted. In particular, according to this aspect, it is not the entire data memory that has to be read out, but rather it can be determined already based on the configuration information whether an update version is relevant at all or not. Consequently, irrelevant updates can be discarded after the configuration information has been read out.

According to a further aspect of the present invention, the updates have security-critical control commands. This has the advantage that security-critical problems can be efficiently taken into account, and it is not necessary to work out specific updates, but rather a combined data packet can be transmitted generically and security measures can be implemented immediately thereby According to a further aspect of the present invention, the mobile end device does not provide any language support. This has the advantage that the mobile end device is selected from the application scenario of the so-called Internet of Things, wherein corresponding end devices do not offer any language functionality compared to smart phones. This creates a clear demarcation from smart phones, and according to the invention it is taken into account that the so-called Internet of Things has its own specific requirements. The proposed invention is particularly advantageous particularly in view of the multiplicity of mobile end devices which have to be equipped with updates.

The object is also achieved by an update arrangement for efficiently distributing embedded control commands to a security element of a mobile end device, having an interface adapted for data-technical transmission of a combined data packet, having several updates for the security element and configuration information from a server to the mobile end device, a processing unit, adapted for reading out of the transmitted configuration information by the security element of the mobile end device and for selection of an update in dependence on the read out configuration information and an actual configuration of the security element and an update unit, adapted for execution of the selected update by the security element for adjusting present control commands of the security element.

The object is also achieved by a computer program product with control commands which implement the method and/or operate the update arrangement.

According to the invention, it is particularly advantageous that the method has method steps which make available functional aspects that can thus also be reproduced by the update arrangement. The update arrangement thus comprises structural features which supply functionality that corresponds to the individual method steps.

BRIEF DESCRIPTION OF THE DRAWINGS

Further advantageous embodiments are explained in more detail with reference to the attached figures. The figures are described as follows.

DETAILED DESCRIPTION OF VARIOUS EMBODIMENTS

Figure 1:
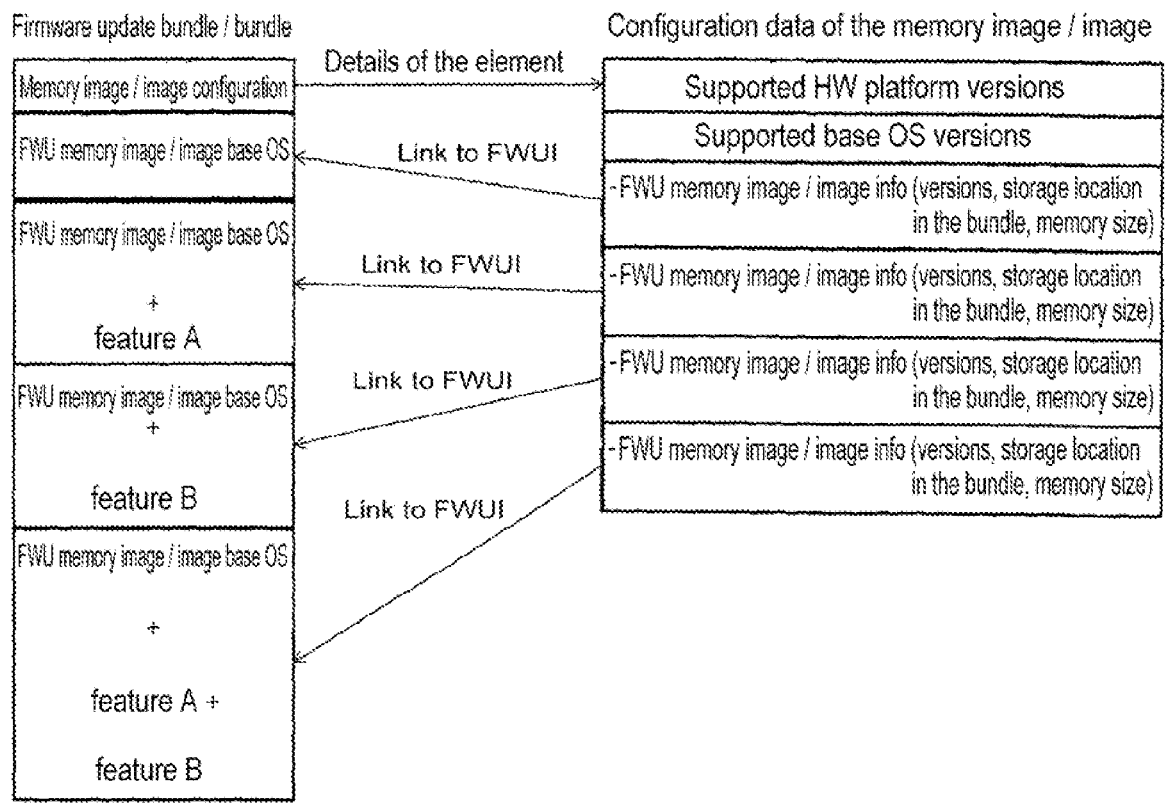
FIG. 1 an overview of a combined data packet according to one aspect of the present invention.

In the present FIG. 1, it is shown on the left side that there is a multiplicity of updates, and on the right side it is shown how this configuration is to be interpreted. Thus, for example, the left side can be the multiplicity of updates including features, and the configuration information is shown on the right side.

The various actualizations or updates of the base platform are thus shown on the left side. The individual data fields contain individual characteristics or features. These are the features A and/or B. The configuration information on the right side has a link that refers to the individual updates in each case. The meta information is also drawn on the right side, stating the version, storage location and memory space of the respective update.

Figure 2:
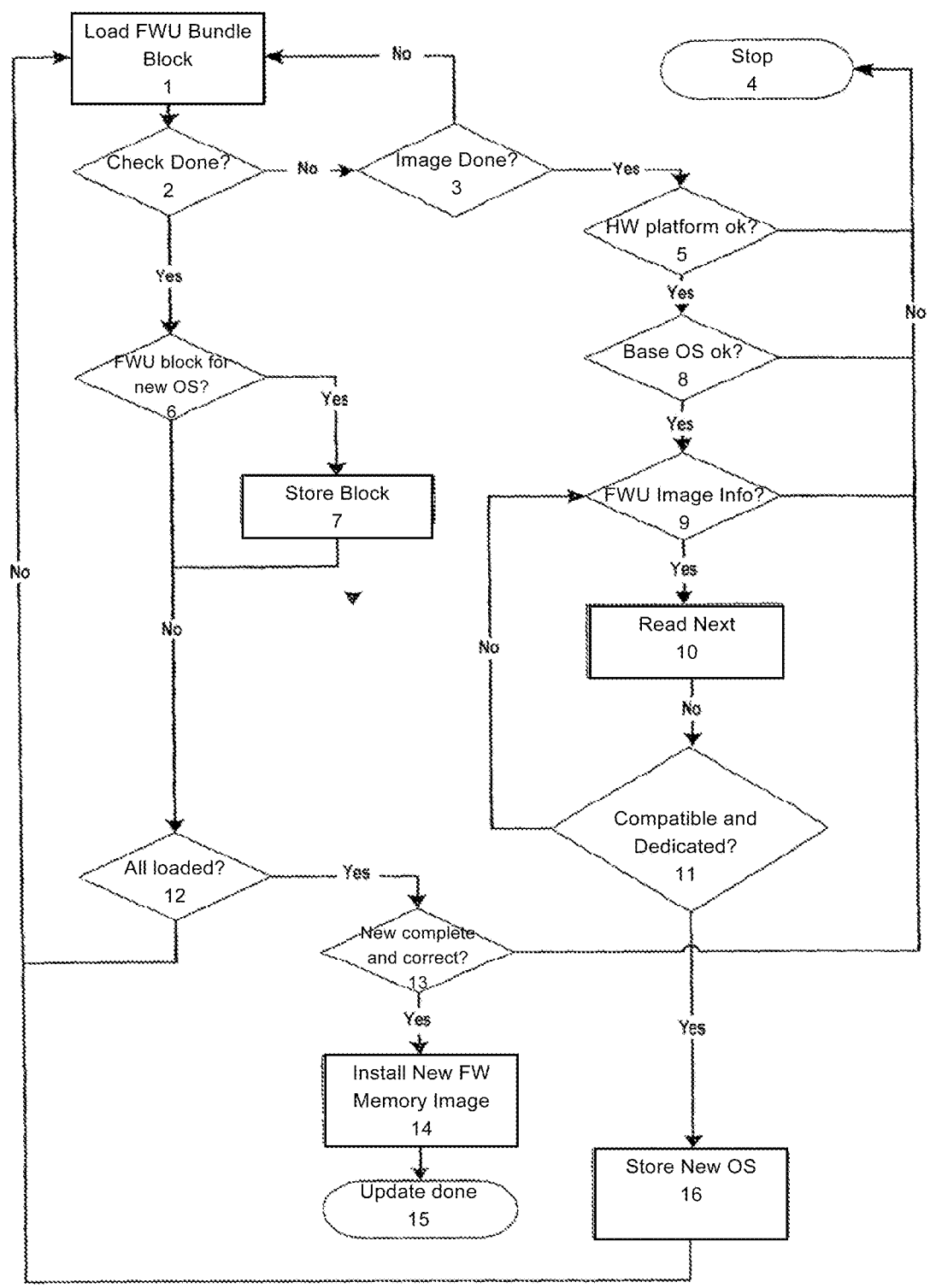
FIG. 2 a schematic flow diagram of the proposed method.

FIG. 2 shows a further example of the proposed method for efficiently distributing embedded control commands, wherein in the following the actualizations are referred to as updates and the optional characteristics are referred to as features. An update for a base platform is therefore an actualization according to the proposed terminology.

Combined firmware update packets can be created, which in a bundle, among other things, contain the following data:
  Image configuration (see below)
  Update(s) for base platform
  Update(s) for base platform+feature A
  Update(s) for base platform+feature B
  Update(s) for base platform+feature A+B According to one aspect of the present invention, the image configuration contains information on the changes and contents of the entire update packet, e.g.:
  Associated HW platform with which these updates are compatible
  Associated basic OS
  List of updates present in the bundle (i.a. with information on versions contained, compatibility information, availability in the bundle, size)

These FWU packets can be generically addressed to the eUICCs by an update server. According to one aspect of the present invention, no further information on the precise configurations is necessary, since all relevant FWU images are contained in the bundle.

These FWU packets can in total be larger than the available HW memory on the eUICC, since several variants are contained.

According to one aspect of the present invention, the processing steps are as follows:
  The handset/terminal sends the bundle in divided data packets to the eUICC via a suitable I/O interface.
  The data relevant for the update are loaded and saved by the eUICC; this includes the image configuration and the relevant FWU image.
  As soon as a data block can be processed, it is processed. When, for example, the image configuration is composed of three data blocks, these are collected until this data block is complete and then evaluated once complete.
  The eUICC reads and analyzes the image configuration at the beginning of the bundle.
  The compatibility of the HW platform and the basic OS is checked.
  The inherent configuration is compared with the image configuration in order to find and select a suitable FWU image.
  When loading the entire bundle, only the selected, relevant FWU image parts are saved. All irrelevant data is discarded and not saved.
  Once all relevant parts have been loaded, the firmware update is processed and completed.

The advantages of the solution are, among other things, as follows:
  The complexity of managing FWU images is significantly reduced. A bundle with all specific update images can be created and easily distributed. Thus e.g. critical security updates can be quickly distributed from a server to all relevant eUICCs.
  An update server does not need to know all eUICC configurations in the field and a handset/terminal can transparently forward the update images to an eUICC.
  Security updates can thus be rolled out relatively quickly and easily to all eUICCs distributed in the field that belong to a corresponding base platform.
  It is also possible to distribute images of several HW platforms in one bundle. For example, for porting to different HW platforms and use cases such as eUICC, IoT or M2M. The target hardware selects itself the data that are relevant for it.

The following method steps result from FIG. 2, which are to be designated with the corresponding parameters as follows:
1: Load FWU bundle block
2: Configuration check done?
3: Image configuration complete?
4: Stop
5: HW platform OK?
6: FWU block for new OS?
7: Store block
8: Base OS OK?
9: FWU image info available?
10: Read next configuration
11: New FWU image compatible and dedicated to current eUICC?
12: All blocks loaded?
13: FMUI new FW image complete and correct?
14: Install new FW memory image
15: Update done
16: Store new OS info (location of new OS in bundle)

Figure 3:
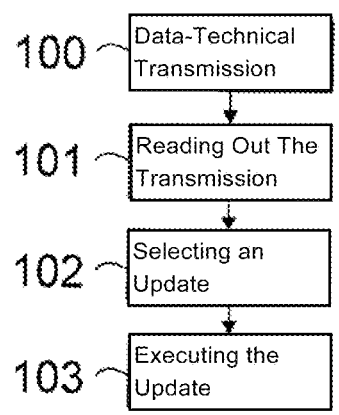
FIG. 3 a further schematic flow diagram of the method for efficiently distributing embedded control commands according to a further aspect of the present invention.

FIG. 3 shows a schematic flow diagram of a method for efficiently distributing embedded control commands to a security element of a mobile end device, having a data-technical transmission 100 of a combined data packet, having several updates for the security element, and configuration information from a server to the mobile end device, a read out 101 of the transmitted 100 configuration information by the security element of the mobile end device and selection 102 of an update in dependence on the read 101 configuration information and an actual configuration of the security element, and an execution 103 of the selected 102 update by the security element to adjust present control commands of the security element.

The invention claimed is:

1. A method for efficiently distributing embedded control commands to a security element of a mobile end device, comprising:
  data-technical transmission of a combined data packet having several updates for the security element and configuration information from a server to the mobile end device;
  reading out the transmitted configuration information by the security element of the mobile end device and selecting an update in dependence on the read out configuration information and an actual configuration of the security element; and
  executing the selected update by the security element to replace present control commands of the security element;
  wherein the security element is supplied as a universal integrated circuit card (UICC) or an embedded universal integrated circuit card (eUICC);
  wherein the configuration information is stored at the beginning of the combined data packet.

2. The method according to claim 1, wherein the embedded control commands are supplied as firmware.

3. The method according to claim 1, wherein each update supplies an independent adjustment of a base platform of the security element.

4. The method according to claim 1, wherein each update has at least one optional feature of an adjustment.

5. The method according to claim 1, wherein the configuration information supplies an indication of one or more of a compatible hardware platform and a compatible operating system.

6. The method according to claim 1, wherein the configuration information describes the updates with reference to one or more of present updates, version, compatibility, availability and memory space requirements.

7. The method according to claim 1, wherein the selection of the update comprises a comparison of the transmitted configuration information with currently created configuration information of the security element.

8. The method according to claim 1, wherein non-selected updates are discarded.

9. The method according to claim 1, wherein the adjustment of present control commands comprises one or more of overwriting, supplementing, changing and expanding control commands.

10. The method according to claim 1, wherein the updates have security-critical control commands.

11. The method according to claim 1, wherein the mobile end device does not supply any language support.

12. A non-transitory computer readable storage medium comprising a computer program product with control commands which execute the method according to claim 1 when the control commands are brought to execution on a computer.

13. An update arrangement for efficiently distributing embedded control commands to a security element of a mobile end device, having:
- an interface adapted for the data-technical transmission of a combined data packet having several updates for the security element and configuration information from a server to the mobile end device;
- a processor unit adapted for reading out of the transmitted configuration information by the security element of the mobile end device and for selection of an update in dependence on the read out configuration information and an actual configuration of the security element; and
- an update unit adapted for execution of the selected update by the security element in order to replace present control commands of the security element;
- wherein the security element is supplied as a universal integrated circuit card (UICC) or an embedded universal integrated circuit card (eUICC);
- wherein the configuration information is stored at the beginning of the combined data packet.

* * * * *